US006963406B2

(12) United States Patent
Price et al.

(10) Patent No.: US 6,963,406 B2
(45) Date of Patent: Nov. 8, 2005

(54) FUSED OFF-AXIS OBJECT ILLUMINATION DIRECT-TO-DIGITAL HOLOGRAPHY WITH A PLURALITY OF ILLUMINATION SOURCES

(75) Inventors: Jeffery R. Price, Knoxville, TN (US); Philip R. Bingham, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 262 days.

(21) Appl. No.: 10/234,042

(22) Filed: Sep. 3, 2002

(65) Prior Publication Data

US 2004/0042056 A1 Mar. 4, 2004

(51) Int. Cl.[7] ............................................. G01B 9/02
(52) U.S. Cl. ..................................... 356/458; 356/514
(58) Field of Search .............................. 356/457, 458, 356/512, 513, 514, 515; 359/9

(56) References Cited

U.S. PATENT DOCUMENTS

| 6,078,392 A | * | 6/2000 | Thomas et al. | 356/457 |
|---|---|---|---|---|
| 6,262,818 B1 | | 7/2001 | Cuche et al. | |
| 6,809,845 B1 | * | 10/2004 | Kim et al. | 356/457 |

FOREIGN PATENT DOCUMENTS

| JP | 2000-35309 | 2/2000 |
|---|---|---|
| WO | WO 01/50201 A1 | 7/2001 |

OTHER PUBLICATIONS

Hecht, "OPTICS" Third Edition, Adelphi University, published by Addison-Wesley Longman, Inc., pp. 465-469 and 599-602, 1998.
Price, "Off-axis Illumination to Improve DDH Imaging Resolution," Image Science and Machine Vision Group, Oak Ridge National Laboratory, pp. 1-38, Sep. 2000.
Vishnyakov et al., "Optico-Physical Measurements Linnik Tomographic Microscope for Investigation of Optically Transparent Objects," Measurement Techniques, vol. 41, No. 18, Oct. 1998, pp. 906-911.
Narumi Tatsuya, "Size Measuring Method by Light Wave Interferometer," Patent Abstracts of Japan, vol. 2000, No. 5, Sep. 14, 2000, abstract and figure 1.
International Search Report dated Mar. 4, 2004, issued in corresponding international application No. PCT/US03/27575.

* cited by examiner

Primary Examiner—Samuel A. Turner
(74) Attorney, Agent, or Firm—John Bruckner PC (57) ABSTRACT

Systems and methods are described for rapid acquisition of fused off-axis illumination direct-to-digital holography. A method of recording a plurality of off-axis object illuminated spatially heterodyne holograms, each of the off-axis object illuminated spatially heterodyne holograms including spatially heterodyne fringes for Fourier analysis, includes digitally recording, with a first illumination source of an interferometer, a first off-axis object illuminated spatially heterodyne hologram including spatially heterodyne fringes for Fourier analysis; and digitally recording, with a second illumination source of the interferometer, a second off-axis object illuminated spatially heterodyne hologram including spatially heterodyne fringes for Fourier analysis.

20 Claims, 4 Drawing Sheets

FUSED OFF-AXIS OBJECT ILLUMINATION DIRECT-TO-DIGITAL HOLOGRAPHY WITH A PLURALITY OF ILLUMINATION SOURCES

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND OF THE INVENTION

1. Field of the Invention

The invention relates generally to the field of direct-to-digital holography (interferometry). More particularly, the invention relates to rapid acquisition of off-axis illuminated holograms for direct-to-digital holography.

2. Discussion of the Related Art

Figure 1:
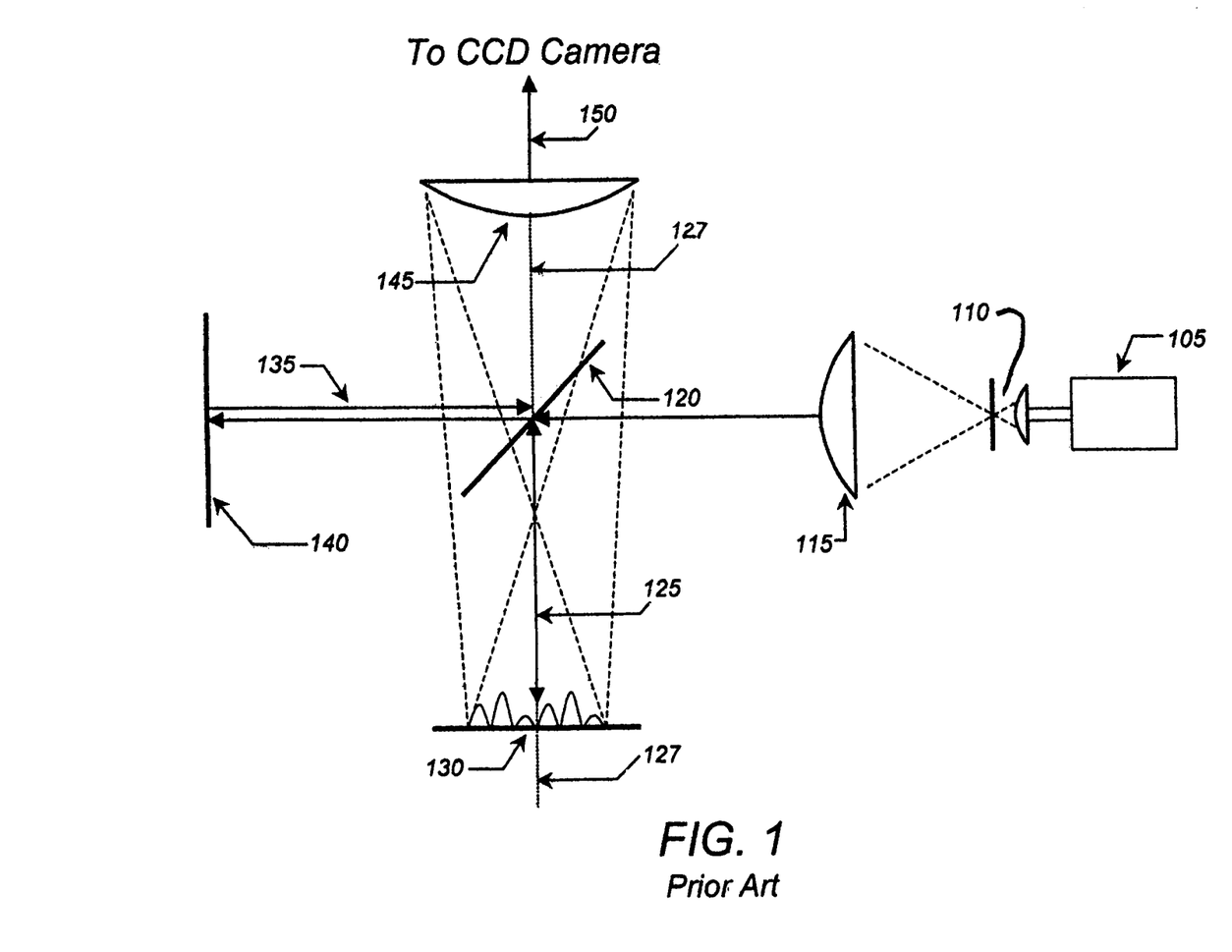
FIG. 1 illustrates a schematic view of a conventional direct-to-digital holography apparatus, appropriately labeled "PRIOR ART."

Prior art direct-to-digital holography (DDH), sometimes called direct-to-digital interferometry, is known to those skilled in the art. For instance, FIG. 1 illustrates one simplified embodiment of a DDH system. Light from a laser source 105 is expanded by a beam expander/spatial filter 110 and then travels through a lens 115. Subsequently, the expanded filtered light travels to a beamsplitter 120. The beamsplitter 120 may be partially reflective. The portion of light reflected from the beamsplitter 120 constitutes an object beam 125 which travels to the object 130. The portion of the object beam 125 is that is reflected by the object 130 then passes through the beamsplitter 120 and travels to a focusing lens 145. This light then passes through the focusing lens 145 and travels to a charge coupled device (CCD) camera (not shown).

The portion of the light from the lens 115 that passes through the beamsplitter 120 constitutes a reference beam 135. The reference beam 135 is reflected from a mirror 140 at a small angle. The reflected reference beam 135 from the mirror then travels toward the beamsplitter 120. The portion of the reference beam 135 that is reflected from the beamsplitter 120 then travels through the focusing lens 145 and toward the CCD camera (not shown). The object beam 125 from the focusing lens 145 and the reference beam 135 from the focusing lens 145 constitute a plurality of object and reference waves 150 and will interfere at the CCD to produce the interference pattern characteristic of a hologram as noted in U.S. Pat. No. 6,078,392.

In FIG. 1, the object beam 125 is parallel to, and coincident with, the optical axis 127. This type of DDH set-up can be referred to as on-axis illumination.

A limitation of this technology has been that the imaging resolution of the DDH system is limited by the optics of the system. The most notable limitation of the optics is the aperture stop, which is required to prevent degradation of the image quality due to aberrations. With regard to a two-dimensional Fourier plane, only object spatial frequencies within a circle of radius $q_0$ can be transmitted. In the case of on-axis illumination, the aperture with radius $q_0$ appears centered on a zero spatial frequency ($q=0$). What is needed, therefore, is an approach that permits spatial frequencies outside the circle of radius $q_0$ to be transmitted.

SUMMARY OF THE INVENTION

There is a need for the following aspects of the invention. Of course, the invention is not limited to these aspects.

According to an aspect of the invention, a process of recording a plurality of off-axis illuminated spatially heterodyne holograms, each of the off-axis illuminated spatially heterodyne holograms including spatially heterodyne fringes for Fourier analysis, comprises: digitally recording, with a first illumination source of an interferometer, a first off-axis illuminated spatially heterodyne hologram including spatially heterodyne fringes for Fourier analysis; and digitally recording, with a second illumination source of the interferometer, a second off-axis illuminated spatially heterodyne hologram including spatially heterodyne fringes for Fourier analysis.

According to another aspect of the invention, a machine operable to digitally record a plurality of off-axis illuminated spatially heterodyne holograms including spatially heterodyne fringes for Fourier analysis, comprises: a plurality of illumination sources; a beamsplitter optically coupled to the plurality of illumination sources; a reference beam mirror optically coupled to the beamsplitter; a focusing lens optically coupled to the reference beam mirror; a digital recorder optically coupled to the focusing lens; and a computer that performs a Fourier transform, applies a digital filter, and performs an inverse Fourier transform, wherein a reference beam is incident upon the reference beam mirror at a non-normal angle, an object beam is incident upon an object at an angle with respect to an optical axis defined by the focusing lens, the reference beam and the object beam are focused by the focusing lens at a focal plane of the digital recorder to form an off-axis illuminated spatially heterodyne hologram including spatially heterodyne fringes for Fourier analysis which are recorded by the digital recorder, and the computer transforms axes of the recorded off-axis illuminated spatially heterodyne hologram including spatially heterodyne fringes in Fourier space to sit on top of a heterodyne carrier frequency defined by an angle between the reference beam and the object beam and cuts off signals around an original origin before performing the inverse Fourier transform.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals within parentheses. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patents, and allowed U.S. Patent Application, disclose embodiments that were satisfactory for the purposes for which they are intended. The entire contents of U.S. Pat. No. 6,078,392, issued Jun. 20, 2000 to C. E. Thomas, L. R. Baylor, G. R. Hanson, D. A. Rasmussen, E. VoelkI, J. Castracane, M. Simkulet and L. Clow, entitled "Direct-to-Digital Holography and Holovision" are hereby expressly incorporated by reference herein for all purposes. The entire contents of allowed U.S. patent application Ser. No. 09/477,267, filed Jan. 4, 2000 by C. E. Thomas and G. R. Hanson, entitled "Improvements To Acquisition and Replay Systems" are hereby expressly incorporated by reference herein for all purposes.

This application contains disclosure that also contained in U.S. Ser. No. 10/234,044, filed Sep. 3, 2002 (now U.S. Pat. No. 6,747,771); and Ser. No. 10/234,043, filed Sep. 3, 2002, the entire contents of all of which are hereby expressly incorporated by reference for all purposes In general, the context of the invention can include obtaining, storing and/or replaying digital data. The context of the invention can include processing digital data that represents an image. The context of the invention can also include transforming data from multiple images into a merged image.

The invention can include a method of acquiring improved resolution holographic imagery from a direct-to-digital holography system using off-axis illumination. The invention can also include an apparatus for acquiring improved resolution holographic imagery with a direct-to-digital holography (DDH) system that uses off-axis illumination.

In general, the object to be observed (imaged) is optically coupled to an illumination source via one or more optical components. As discussed with regard to FIG. 1, the illumination beam is typically passed through the center of the target objective (i.e., lens system) along, and thus parallel to, the optical axis. This type of DDH configuration can be referred to as "on-axis illumination" and allows spatial frequencies (q) of the object to be acquired up to a certain limit ($q0$), which is determined by the objective aperture.

The invention can include an "off-axis illumination" scenario, where the illumination source is displaced laterally so that the beam will pass through the object objective off-center yet still parallel to the optical axis. The illumination will, due to the focusing effect of the objective, be incident upon the object at some angle to the optical axis. Due to this off-axis illumination, higher spatial frequencies ($q>q0$) of the object can pass through the objective aperture, and thus be observed, than can with on-axis illumination. This is an important advantage of the invention.

The invention can include an extended DDH system (apparatus) adapted to digitally capture the on-axis- and one, or more, off-axis-illuminated holograms of the same object. The invention can also include analyzing and/or processing (fusing) the digitally captured data. The resulting, fused image will contain a wider range of spatial frequencies than in any of the original holograms, thus providing a significant increase in the nominal imaging resolution of the system compared to the case where no off-axis-illuminated data is available.

As noted above, the imaging resolution of fundamental DDH systems is limited by the optics, most notably the aperture stop, which is required to prevent degradation of the image quality due to aberrations. This means the optics of the DDH system are such that only object spatial frequencies within a circle of radius $q0$ can be transmitted. In the case of on-axis illumination, the aperture with radius $q0$ appears centered on a zero spatial frequency ($q=0$). In the case of off-axis illumination, the aperture with radius $q0$ appears shifted (e.g., to the left) in the frequency domain. This implies that in the direction in which the aperture is shifted, spatial frequencies with $q>q0$ are transmitted. On the downside, some spatial frequencies with q close to $q0$ are "lost" in the opposite direction. By acquiring a second image with the illumination shifted in the opposite direction, the aperture appears shifted (e.g., to the right) and thus the spatial frequencies "lost" from the first image are regained with additional frequencies beyond $q0$. Fusing the information from the two images results in one image with better resolution. Since DDH records the phase information on the complex image wave, the information from both (or more) images can be fused with surprisingly advantageous results. The invention improves the resolution of generic object structures regardless of orientation.

The invention can include an extension of the fundamental DDH system to automatically capture both on-axis and off-axis illuminated holograms. The invention can also include methods to analyze and fuse the results of these holograms to produce a representation of the observed object with more spatial resolution than available in the prior DDH art.

As evident in FIG. 1, the object beam 125 is parallel to the optical axis 127. As noted above, this set-up can be referred to as on-axis illumination. Off-axis illumination, on the other hand, refers to the case where the object beam 125 is incident upon the object 130 at some angle with respect to the optical axis 127 (an example is illustrated by the object team 215,305 shown in FIG. 3). There are many methods to achieve off-axis illumination; the approach presented hereafter is intended to serve only as a representative, and therefore non-limiting example.

Figure 2:
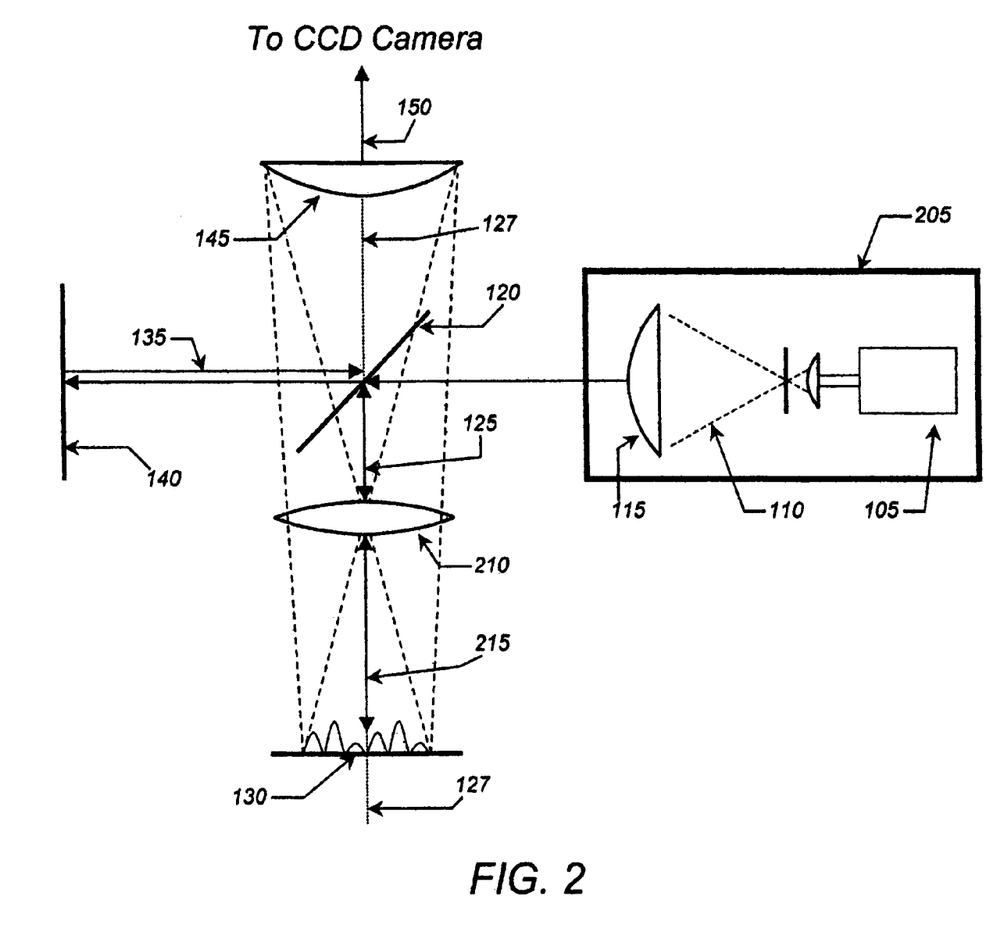
FIG. 2 illustrates a schematic view of an off-axis illumination direct-to-digital holography apparatus (interferometer) in an on-axis position, representing an embodiment of the invention.
Figure 3:
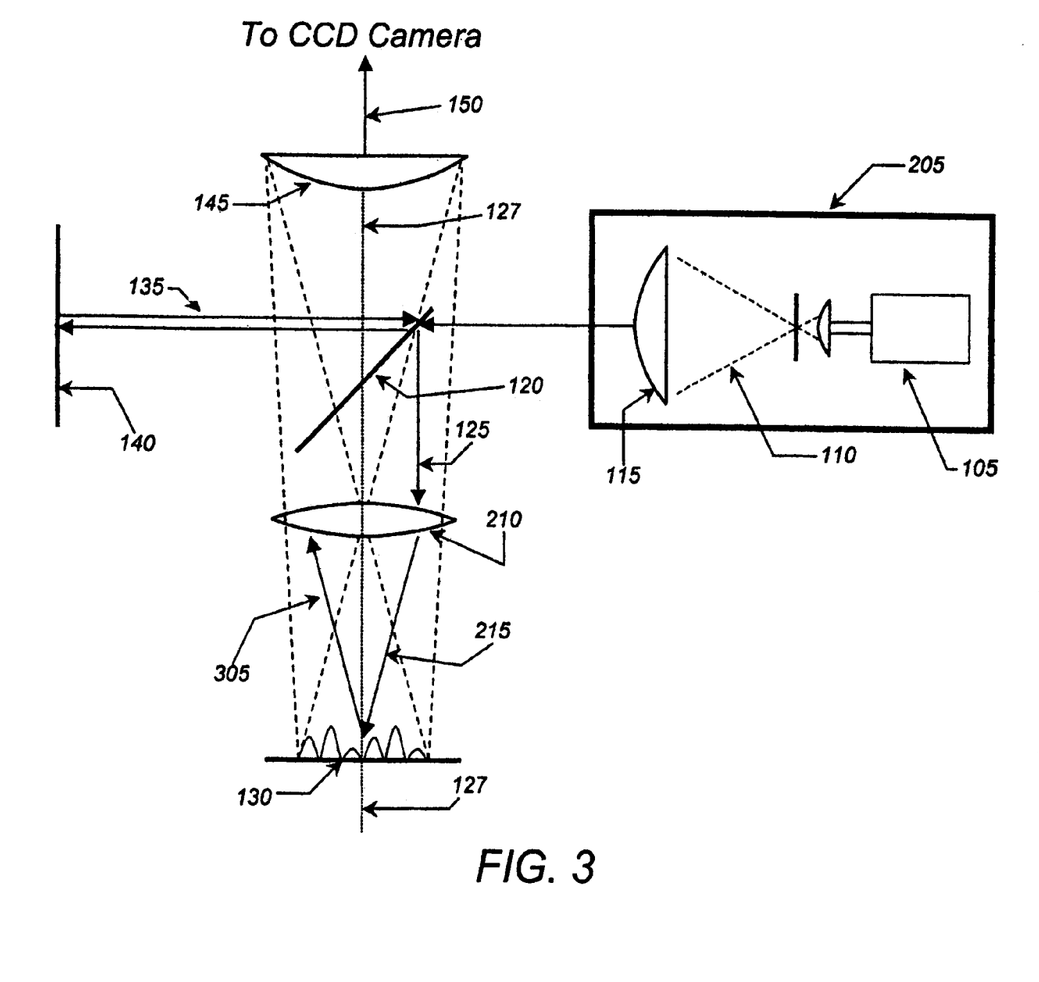
FIG. 3 illustrates a schematic view of the off-axis illumination direct-to-digital holography apparatus (interferometer) of FIG. 2 in an off-axis position.

Referring to FIGS. 2 and 3, an embodiment of an off-axis illumination DDH apparatus is illustrated. In FIGS. 2 and 3, there are two primary modifications from FIG. 1. A first modification is that the laser source 105, the beam expander/spatial filter 110, and the lens 115 are grouped into a computer-controlled, moveable enclosure 205. The enclosure 205 can be movable along an axis that is substantially parallel to the optical axis 127. In more detail, the enclosure 205 can be movable along an axis that is substantially coplanar with a normal to the beamsplitter 120.

Still referring to FIGS. 2 and 3, a second modification is the addition of the object objective 210. In FIG. 2, the laser source enclosure 205 is positioned so that the object beam 125 reflects off of the beamsplitter 120 to pass through the center of the object objective 210. The object beam 125 then leaves the object objective 210 and is incident upon the object 130, centered around the optical axis 127. In this configuration, on-axis illumination is achieved and the system of FIG. 2 is effectively the same as that in FIG. 1.

In FIG. 3, however, the laser source enclosure 205 is shifted (up in this particular configuration) so that the object beam 125 passes through the object objective 210 off-center. Of course, the laser source enclosure 205 can alternatively be shifted down. Because of the focusing properties of the object objective 210, the object beam 215 leaving the object objective 210 is incident upon the object 130 at some angle with respect to the optical axis 127, thereby achieving off-axis illumination. Thus, the object beam 215 can be incident upon the object 130 substantially non-parallel to the optic axis 127. The object beam 305 reflected from the object passes back through the object objective 210 off-axis, but due to the optical properties of the object objective 210 and the focusing lens 150 is still focused on the CCD (not shown). In the off-axis illumination case, the properties of diffraction$^{(1)}$ imply that the hologram formed at the CCD by the interference of the object beam 305 and the reference beam 135 will contain some spatial frequencies of the object that are not observed using on-axis illumination.

Thus, the invention can include an apparatus operable to digitally record a spatially heterodyne hologram including spatially heterodyne fringes for Fourier analysis, comprising: a laser; a beamsplitter optically coupled to the laser; a reference beam mirror optically coupled to the beamsplitter; an object optically coupled to the beamsplitter; a focusing lens optically coupled to both the reference beam mirror and the object; a digital recorder optically coupled to the focusing lens; and a computer for performing a Fourier transform, applying a digital filter, and performing an inverse Fourier transform, wherein a reference beam is incident upon the reference beam mirror at a non-normal angle, an object beam is incident upon the object at an angle with respect to an optical axis defined by the focusing lens, the reference beam and an object beam, which constitute a plurality of simultaneous reference and object waves, are focused by the focusing lens at a focal plane of the digital recorder to form a spatially heterodyne hologram including spatially heterodyne fringes for Fourier analysis which is recorded by the digital recorder, and the computer transforms axes of the recorded spatially heterodyne hologram including spatially heterodyne fringes in Fourier space to sit on top of a heterodyne carrier frequency defined by an angle between the reference beam and the object beam and cuts off signals around an original origin before performing the inverse Fourier transform. The apparatus can include an object objective optically coupled between the beamsplitter and the object. The apparatus can include an aperture stop coupled between the object and the focusing lens. The beamsplitter, the reference beam mirror and the digital recorder can define a Michelson geometry. The beamsplitter, the reference beam mirror and the digital recorder can define a Mach-Zehner geometry. The apparatus can also include a digital storage medium coupled to the computer for performing a Fourier transform, applying a digital filter, and performing an inverse Fourier transform. The digital recorder can include a CCD camera 350 that defines pixels. The apparatus can include a beam expander/spatial filter 230 optically coupled between the laser and the beamsplitter. The angle between the reference beam and the object beam, and a magnification provided by the focusing lens, can be selected in order that the digital recorder may resolve features of the spatially heterodyne hologram including spatially heterodyne fringes for Fourier analysis. So that the digital recorder may resolve a feature, two fringes, each having two pixels per fringe, can be provided. The invention can include a spatially heterodyne hologram produced by the above-described apparatus, embodied on a computer-readable medium.

Accordingly, the invention can include a method of recording a spatially heterodyne hologram including spatially heterodyne fringes for Fourier analysis, comprising: splitting a laser beam into a reference beam and an object beam; reflecting the reference beam from a reference mirror at a non-normal angle; reflecting the object beam from an object at an angle with respect to an optical axis defined by a focusing lens; focusing the reference beam and the object beam, which constitute a plurality of simultaneous reference and object waves, with the focusing lens at a focal plane of a digital recorder to form a spatially heterodyne hologram including spatially heterodyne fringes for Fourier analysis; digitally recording the spatially heterodyne hologram including spatially heterodyne fringes for Fourier analysis; Fourier analyzing the recorded spatially heterodyne hologram including spatially heterodyne fringes by transforming axes of the recorded spatially heterodyne hologram including spatially heterodyne fringes in Fourier space to sit on top of a heterodyne carrier frequency defined as an angle between the reference beam and the object beam; applying a digital filter to cut off signals around an original origin; and then performing an inverse Fourier transform. The method can include diffracting the object beam with an object objective before reflecting the object beam from an object at an angle with respect to an optical axis defined by a focusing lens and after reflecting the object beam from an object at an angle with respect to an optical axis defined by a focusing lens. The step of transforming axes of the recorded spatially heterodyne hologram can include transforming with an extended Fourier transform. The step of digitally recording can include detecting the beams with a CCD camera that defines pixels. The off-axis illuminated spatially heterodyne hologram can be an off-axis illuminated spatially low-frequency heterodyne hologram; the phrase low-frequency implies that the fundamental fringe spatial frequency is below the Nyquist sampling limit. The method can also include storing the spatially heterodyne hologram including spatially heterodyne fringes for Fourier analysis as digital data. The method can also include replaying the Fourier analyzed spatially heterodyne hologram. The method can also include transmitting the Fourier analyzed spatially heterodyne hologram. The invention can include a spatially heterodyne hologram prepared by the above-described method(s), embodied on a computer-readable medium.

Rapid Acquisition

In FIG. 3, the illumination source enclosure 120 is mechanically displaced so that the object beam 130 passes through the object objective 135 off-center. If only a single object illumination source is used, this implies that the capture of successive, differently illuminated holograms requires the mechanical movement of the object illumination source. Such mechanical movement can be quite slow. The mechanical displacement of the illumination source can limit application of off-axis technology in time-constrained scenarios. Therefore, there is also a need for an approach that addresses the need for high-speed off-axis illumination capabilities.

The invention can include an apparatus and method(s) for acquiring improved resolution holographic imagery, at a much higher rate than the prior art, by combining the results of multiple, differently illuminated holograms in a direct-to-digital holography (DDH) system. The invention employs multiple illumination sources. The invention can include multiple sources that are physically positioned to achieve multiple illumination conditions. The invention can include multiple, computer-controlled sources that are switched off and on in rapid succession to capture the different holograms. By eliminating physical displacement of the illumination and the associated time cost, the invention permits off-axis illumination, with its associated imaging resolution improvement, to be applied in time-constrained environments where it was previously inapplicable.

Figure 4:
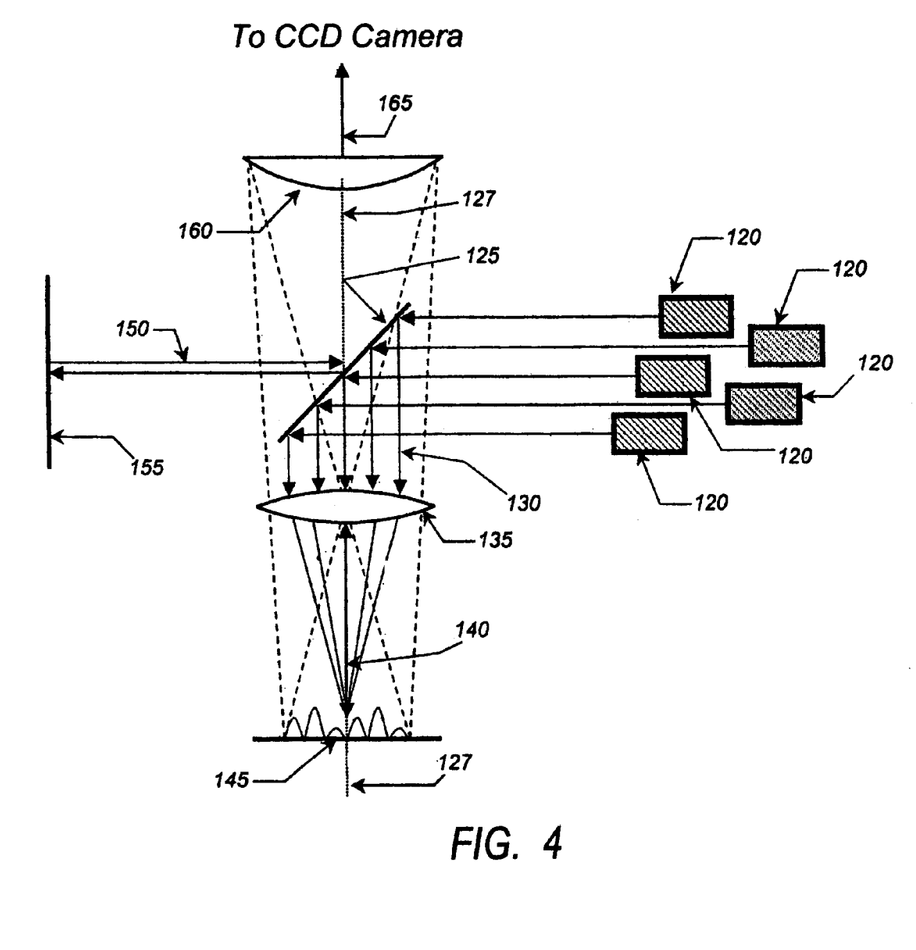
FIG. 4 illustrates a schematic view of an off-axis illumination direct-to-digital holography apparatus (interferometer) with multiple illumination sources, representing an embodiment of the invention.

Referring to FIG. 4, the invention can include multiple illumination sources 120. Note that FIG. 4 employs five sources only as a representative example. Obviously, the number of illumination sources can vary depending upon specific requirements. The multiple illumination sources can be computer controlled so that they can be switched off and on in rapid succession, allowing the capture of multiple, differently illuminated holograms without physically displacing any components. The result will be a substantial time savings since methods for rapidly switching the illumination sources (well known to those skilled in the art) require much less time than physical displacement. The system, however, may still maintain physical displacement capabilities for additional flexibility. With the time savings provided by rapidly firing multiple illumination sources, the invention can allow the application of multiple-shot, off-axis illumination (and the subsequent resolution improvement) to time-constrained scenarios where only single-shot imaging was previously applicable.

The embodiment shown in FIG. 4 shows a staggered planar array of lasers as the structure for performing the function of rapidly switching through a plurality of off-axis illumination angles, but the structure for rapidly switching through a plurality of off-axis illumination angles can be any other structure capable of performing the function of rapidly switching through a plurality of off-axis illumination angles, including, by way of example a parallel (planar) array, a radial (planar) array, or even a polygonal (planar) array.

One of the disclosed embodiments shows a computer controlled, moveable enclosure as the structure for performing the function of aligning the source, beam expander/spatial filter and lens so that the object beam passes through the object objective on-center or off-center, but the structure for aligning the source, beam expander/spatial filter and lens can be any other structure capable of performing the function of aligning the object beam so that it passes through the object objective on-center or off-center, including, by way of example a moveable platform for displacing the beamsplitter, the mirror, the object objective, the object, the focusing lens and the CCD camera relative to the source, beam expander/spatial filter and lens, or as another example, a series of movable optical elements (e.g., mirrors), or as another example a flexible optical fiber and/or cable.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system. The phrase low-frequency, as used herein, can be defined as implying that the fundamental fringe spatial frequency is below the Nyquist sampling limit.

Practical Applications of the Invention

A practical application of the invention that has value within the technological arts is metrology. The invention is useful in conjunction with microelectronic(mechanical) fabrication, such as for semiconductor inspection. The invention is also useful in conjunction with nanotechnology research, development and manufacturing, such as nanovisualization, nanomeasurement, or the like. The invention is useful in the context of an interferometer using digital processing and/or a digital data acquisition, for example, a direct-to-digital holography tool based on electron holography. There are virtually innumerable uses for the invention, all of which need not be detailed here.

Advantages of the Invention

A method, apparatus and/or computer program, representing an embodiment of the invention, can be cost effective and advantageous for at least the following reasons. The invention provides multiple illumination sources. The invention provide for high-speed capture of multiple, differently illuminated holograms. The invention can provide computer-control of object illumination. The invention can provide fusion of results from multiple holograms. The invention can provide significantly increased imaging resolution. The invention improves quality and/or reduces costs compared to previous approaches.

All the disclosed embodiments of the invention disclosed herein can be made and used without undue experimentation in light of the disclosure. The invention is not limited by theoretical statements recited herein. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, variation may be made in the steps or in the sequence of steps composing methods described herein. Further, although the apparatus described herein can be a separate module, it will be manifest that the apparatus may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES (1) Goodman, Joseph W., "Introduction to Fourier Optics," McGraw-Hill, 1998.
(2) VoelkI, E. et al., "Introduction to Electron Holography," Kluwer Academics/Plenum Publishers, 1999.
(3) Eugene Hecht, "Optics, Third Edition," Addison-Wesley, 1998, page 465–469; 599–602.

What is claimed is:

1. A method of recording a plurality of off-axis object illuminated spatially heterodyne holograms, each of the off-axis object illuminated spatially heterodyne holograms including spatially heterodyne fringes for Fourier analysis, comprising:
    digitally recording, with a first illumination source of an interferometer, a first off-axis object illuminated spatially heterodyne hologram including spatially heterodyne fringes for Fourier analysis; and
    digitally recording, with a second illumination source of the interferometer, a second off-axis object illuminated spatially heterodyne hologram including spatially heterodyne fringes for Fourier analysis.

2. The method of claim 1, wherein
    digitally recording with the first illumination source of the interferometer the first off-axis object illuminated spatially heterodyne hologram including spatially heterodyne fringes for Fourier analysis includes refracting an object beam with an object objective before reflecting the object beam from an object at an angle with respect to en optical axis defined by a focusing lens, and refracting the object beam with the object objective after reflecting the object beam from the object at the angle with respect to the optical axis defined by the focusing lens and
    digitally recording with the second illumination source of the interferometer the second off-axis object illuminated spatially heterodyne hologram including spatially heterodyne fringes for Fourier analysis includes refracting the object beam with the object objective before reflecting the object beam from the object at an angle with respect to the optical axis defined by a focusing lens, and refracting the object beam with the object objective after reflecting the object beam from the object at the angle with respect to the optical axis defined by the focusing lens.

3. The method of claim 1, further comprising
    Fourier analyzing the first recorded off-axis object illuminated spatially heterodyne hologram including spatially heterodyne fringes by transforming axes of the first recorded off-axis object illuminated spatially heterodyne hologram including spatially heterodyne fringes in Fourier space to sit on top of a heterodyne carrier frequency defined as an angle between the reference beam and the object beam; applying a digital filter to cut off signals around an original origin; and then performing an inverse Fourier transform; and
    Fourier analyzing the second recorded off-axis object illuminated spatially heterodyne hologram including spatially heterodyne fringes by transforming axes of the second recorded off-axis object illuminated spatially heterodyne hologram including spatially heterodyne fringes in Fourier space to sit on top of a heterodyne carrier frequency defined as an angle between the reference beam and the object beam; applying a digital filter to cut off signals around an original origin; and then performing an inverse Fourier transform.

4. The method of claim 3, further comprising fusing the first Fourier analyzed off-axis object illuminated spatially heterodyne hologram with the second Fourier analyzed off-axis object illuminated spatially heterodyne hologram to compute a single reconstructed image.

5. The method of claim 4, further comprising replaying the single composite image.

6. The method of claim 4, further comprising transmitting the single composite image.

7. The method of claim 1, further comprising storing the first off-axis object illuminated spatially heterodyne hologram including spatially heterodyne fringes for Fourier analysis as digital data and storing the second off-axis object illuminated spatially heterodyne hologram including spatially heterodyne fringes for Fourier analysis as digital data.

8. A computer program, comprising computer or machine readable program elements translatable for implementing the method of claim 1.

9. A machine readable media comprising data generated by the method of claim 1.

10. An apparatus operable to digitally record a plurality of off-axis object illuminated spatially heterodyne holograms including spatially heterodyne fringes for Fourier analysis, comprising:
   a plurality of illumination sources;
   a beamsplitter optically coupled to the plurality of illumination sources;
   a reference beam mirror optically coupled to the beamsplitter;
   a focusing lens optically coupled to the reference beam mirror;
   a digital recorder optically coupled to the focusing lens; and
   a computer that performs a Fourier transform, applies a digital filter, and performs an inverse Fourier transform,
   wherein a reference beam is incident upon the reference beam mirror at a non-normal angle, an object beam is incident upon an object at an angle with respect to an optical axis defined by the focusing lens, the reference beam end the object beam are focused by the focusing lens at a focal plane of the digital recorder to form an off-axis object illuminated spatially heterodyne hologram including spatially heterodyne fringes for Fourier analysis which is recorded by the digital recorder, and the computer transforms axes of the recorded off-axis object illuminated spatially heterodyne hologram including spatially heterodyne fringes in Fourier space to sit on top of a heterodyne carrier frequency defined by an angle between the reference beam and the object beam and cuts off signals around an original origin before performing the inverse Fourier transform.

11. The apparatus of claim 10, further comprising an object objective optically coupled between the beamsplitter and the object.

12. The apparatus of claim 10, wherein each of the plurality of illumination sources includes a laser.

13. The apparatus of claim 10, wherein each of the plurality of illumination sources is switchably controlled by the computer.

14. The apparatus of claim 10, wherein the plurality of illumination sources are moveable relative to the beamsplitter.

15. The apparatus of claim 10, wherein the beamsplitter, the reference beam mirror and the digital recorder define a Michelson geometry.

16. The apparatus of claim 10, wherein the beamsplitter, the reference beam mirror and the digital recorder define a Mach-Zehner geometry.

17. The apparatus of claim 10, further comprising a digital storage medium coupled to the computer for performing a Fourier transform, applying a digital filter, and performing an inverse Fourier transform.

18. The apparatus of claim 10, wherein the digital recorder includes a CCD camera that defines pixels.

19. The apparatus of claim 18, wherein the angle between the reference beam and the object beam, and a magnification provided by the focusing lens, are selected in order that the digital recorder may resolve features of the off-axis object illuminated spatially heterodyne hologram including spatially heterodyne fringes for Fourier analysis end two fringes, each having two pixels per fringe, are provided.

20. A machine readable media comprising data generated using the apparatus of claim 10.

* * * * *